United States Patent
Iyengar

(10) Patent No.: US 7,295,950 B2
(45) Date of Patent: Nov. 13, 2007

(54) MONITORING MULTIPLE CHANNELS OF DATA FROM REAL TIME PROCESS TO DETECT RECENT ABNORMAL BEHAVIOR

(75) Inventor: Vijay Sourirajan Iyengar, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/159,445

(22) Filed: Jun. 23, 2005

(65) Prior Publication Data

US 2007/0005301 A1  Jan. 4, 2007

(51) Int. Cl.
*G06F 17/40* (2006.01)

(52) U.S. Cl. ............... 702/182; 340/500; 340/679; 700/90; 700/108; 702/183; 702/185; 702/187

(58) Field of Classification Search ........... 340/500, 340/679, 870.01, 870.16; 700/11, 23, 26, 700/90, 108; 702/127, 182, 183, 185, 187; 707/1, 100, 101, 104.1; 714/25, 26, 124
See application file for complete search history.

(56) References Cited

U.S. PATENT DOCUMENTS

| | | | | |
|---|---|---|---|---|
| 2,883,255 A * | 4/1959 | Anderson | ............... | 346/34 |
| 3,142,820 A * | 7/1964 | Daniels | ............... | 710/15 |
| 3,184,725 A * | 5/1965 | Martin et al. | ............... | 340/674 |
| 3,351,910 A * | 11/1967 | Miller et al. | ............... | 714/47 |
| 4,847,795 A * | 7/1989 | Baker et al. | ............... | 702/184 |
| 5,070,468 A * | 12/1991 | Niinomi et al. | ............... | 702/185 |
| 5,471,631 A * | 11/1995 | Beardsley et al. | ............... | 713/502 |
| 5,590,040 A * | 12/1996 | Abe et al. | ............... | 701/35 |
| 5,913,036 A * | 6/1999 | Brownmiller et al. | ............... | 709/224 |
| 5,923,247 A * | 7/1999 | Dowden et al. | ............... | 340/506 |
| 6,006,016 A * | 12/1999 | Faigon et al. | ............... | 714/48 |
| 6,018,300 A * | 1/2000 | Dowden et al. | ............... | 340/635 |
| 6,131,076 A * | 10/2000 | Stephan et al. | ............... | 702/189 |
| 6,256,594 B1* | 7/2001 | Yamamoto et al. | ............... | 702/185 |
| 6,327,677 B1* | 12/2001 | Garg et al. | ............... | 714/37 |
| 6,742,143 B2* | 5/2004 | Kaler et al. | ............... | 714/39 |
| 6,859,739 B2* | 2/2005 | Wegerich et al. | ............... | 702/32 |
| 6,966,015 B2* | 11/2005 | Steinberg et al. | ............... | 714/47 |
| 2002/0170002 A1* | 11/2002 | Steinberg et al. | ............... | 714/39 |
| 2003/0135382 A1* | 7/2003 | Marejka et al. | ............... | 705/1 |
| 2003/0140282 A1* | 7/2003 | Kaler et al. | ............... | 714/39 |

FOREIGN PATENT DOCUMENTS

JP  08-233895 A * 9/1996
WO  WO 96/20549 A1 * 7/1996

* cited by examiner

*Primary Examiner*—Edward R Cosimano
(74) *Attorney, Agent, or Firm*—Cantor Colburn LLP; Lisa M. Yamonaco

(57) ABSTRACT

Provides methods, systems and apparatus for generating alerts for a system process that obtains raw channel data over time from one or more monitored channel of the system process. An example method includes processing the raw channel data to form time dependent signals based one or more user specified processing rules. The method produces alerts based on the deviation in behavior in one or more channels, where the deviation is quantified by a numeric level computed by comparing signals for varying time intervals with historically normal baseline signals. The method may include filtering the alerts to selectively form reportable alerts that are presented to the user based on user specified filtering rules.

20 Claims, 3 Drawing Sheets

MONITORING MULTIPLE CHANNELS OF DATA FROM REAL TIME PROCESS TO DETECT RECENT ABNORMAL BEHAVIOR

FIELD OF INVENTION

The current invention relates to monitoring multiple channels of data from real time processes, and more particularly to detecting recent abnormal behavior using the data monitored.

BACKGROUND OF THE INVENTION

The monitoring of multiple channels of real-time data plays a key role in business processes in various domains. For example, in the production context (say, in the Oil and Gas Industry) sensors monitor various parameters and produce information at various temporal granularities. An important reason for this monitoring is to detect abnormal situations in a timely fashion to take corrective action. This monitoring can be done by domain experts but that can be an expensive and inconvenient process especially when this has to be done round-the-clock. For each situation, one can envision building a new system from scratch that mimics the monitoring done by the human expert as a possible solution to this problem. This can be an expensive proposition if there are multiple situations to be considered in each domain. Also, one has to find a way to incorporate domain knowledge related to the channels being monitored and the notion of abnormality in the detection process.

In U.S. Pat. No 6,131,076 a method and system is disclosed for automatically establishing operational parameters of a statistical surveillance system. This is done using transformations of the time dependent data into the frequency domain and using sequential probability ratio test (SPRT).

In U.S. Pat. No. 6,859,739 a model-based surveillance system is disclosed for monitoring or controlling a process or machine. This system uses model-based estimates of operational parameters to indicate whether the process or machine is operating in a stable state or is in a transition from one state to another.

In some domains, the partial domain knowledge may be available on the relationships between various sensor values. It is important to be able to perform monitoring even in this scenario in a robust fashion detecting recent abnormal behavior in a timely fashion without too many false alarms. Also, training data containing examples of abnormal behavior may not exist. Therefore a need exists for a system to detect recent abnormal behavior using data from multiple channels in a domain with these characteristics.

SUMMARY

Therefore, the present invention provides methods systems and apparatus for monitoring multiple channels of data from real time processes, and more particularly for detecting recent abnormal behavior using the monitored data.

It is therefore an aspect of the present invention to present a method and apparatus to generate alerts indicating abnormal behavior by monitoring multiple channels of raw data from a monitored entity. In an example embodiment alerts are generated by processing raw channel data to form time dependent signals based on user customization in the form of processing rules. The time dependent signals from a set of channels are used to compute deviations in behavior by considering varying time intervals and comparing the signals with historically normal baseline signals. The computed deviations are used to produce alerts indicating abnormal behavior in one or more channels.

BRIEF DESCRIPTION OF THE DRAWINGS

Features and advantages of the present invention will become more apparent by describing in detail the embodiment of the present invention hereinafter in conjunction with the drawings, in which.

DEFINITIONS

Linkage: Forming a linkage between a channel A and a channel B is a way to specify dependence of A on B. Channel B is said to be linked to channel A.

Steady: A channel is said to be steady over a period of time if its values vary less than a user defined amount in that period.

Stable: A channel is said to be stable at a point in time T if its linked channels have been steady for at least a user specified time prior to time T.

DETAILED DESCRIPTION OF THE INVENTION

The present invention provides systems, methods and apparatus for monitoring multiple channels of data from real time processes, and more particularly for detecting recent abnormal behavior using the monitored data. The invention detects recent abnormal behavior using data from multiple channels in a domain with these characteristics. Entities with real time processes can generate multiple channels data over time that represents various aspects of the behavior of the entity. Detecting abnormality in the recent behavior of the entity in a timely fashion without excessive false alarms is important in many domains. The present invention is a system that monitors multiple channels of real time data to detect recent abnormal behavior.

In some domains, the partial domain knowledge may be available on the relationships between various sensor values. It is important to be able to perform monitoring even in this scenario in a robust fashion detecting recent abnormal behavior in a timely fashion without too many false alarms. Also, training data containing examples of abnormal behavior may not exist. Therefore a need exists for a system to detect recent abnormal behavior using data from multiple channels in a domain with these characteristics.

The present invention provides methods and apparatus to generate alerts indicating abnormal behavior by monitoring multiple channels or raw data from a monitored entity. In an example embodiment alerts are generated by processing raw channel data to form time dependent signals based on user customization in the form of processing rules. The time dependent signals from a set of channels are used to compute deviations in behavior by considering varying time intervals and comparing the signals with historically normal baseline signals. The computed deviations are used to produce alerts indicating abnormal behavior in one or more channels.

Figure 1:
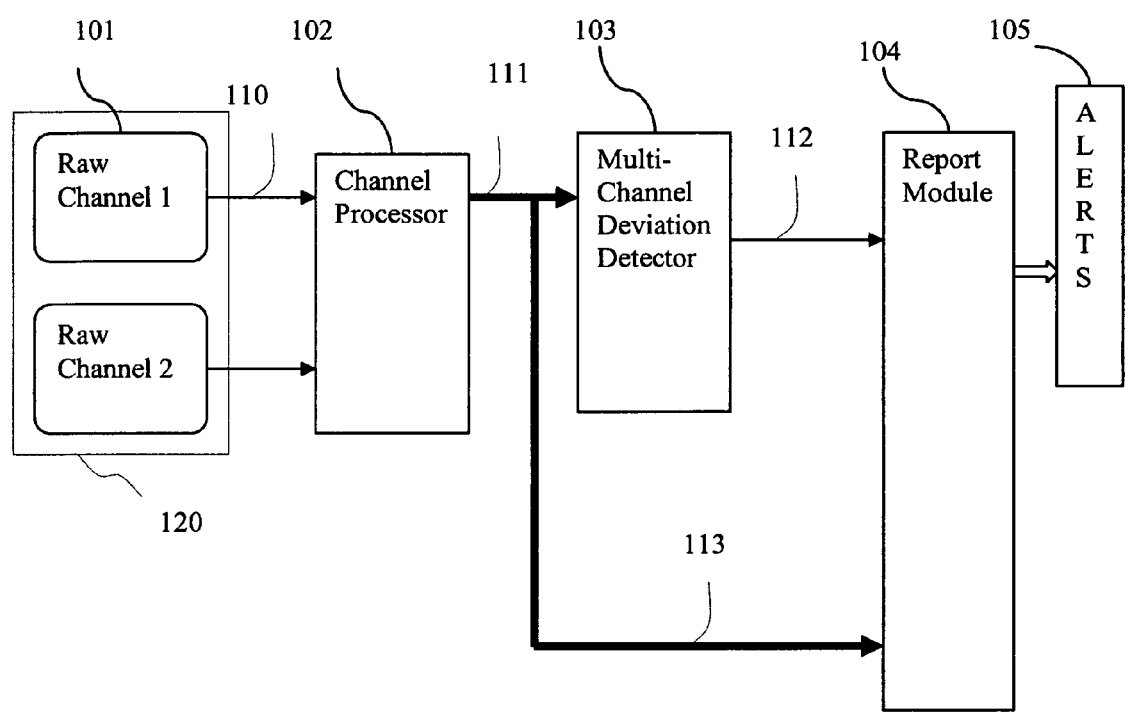
FIG. 1 is an illustration of the system according to an embodiment of the present disclosure.

Referring to FIG. 1, a system is depicted for generating alerts detecting recent abnormal behavior in a monitored entity. The input data to the system is received by an interface module 120, and is indicated by multiple raw channels 101 of which two instances are shown. The interface module obtains raw channel data over a time duration for each monitored channel. The data from each raw channel, referred to as raw channel data, consists of a numerical value V and a time t indicating when that value was observed. A raw channel can be associated with either control information or sensor information from the monitored entity. For example, a control channel C1 could represent the setting of a valve controlling fluid flow in a tube. The measurement of the pressure downstream of the control valve is an example of raw channel C2 containing sensor information. The data from the raw channels is input 110 to the channel processor 102. The channel processor 102 processes the data from the raw channels also called raw channel data to form time dependent signals. This processing is done using user specified rules that will be referred to as processing rules. The user is allowed to specify for each channel a set of linked channels indicated relationship in their values. The user defined rule for processing a raw channel data value into a signal is specified in terms of the data of the channel in question and the linked channels. For example, the signal for the control channel C2 introduced earlier indicates the control channel signal is considered to be steady when its values vary less than a user-specified amount over a defined past time interval.

The sensor channel C2 introduced earlier can be used to illustrate the use of linked channels in the channel processor. The user can specify that the channel C2 (downstream pressure) is linked to channel C1 (valve setting). The operating region of interest for the monitoring might be when the valve setting is steady. This can be handled in the channel processor by processing the data at a point in time from C2 into a signal that flags it as being stable when the linked channel C1 has been steady for a user defined minimum period of time. Another example of the use of the linked channel in the channel processor is to have the signal produced contain the deviation between the actual channel value and the expected value, where the expected value is expressed in terms of the values of the channel in question and the linked channels. As an illustration, the expected value of a channel C3 could be based on a linear relationship to the most recent value on channel C4. The signal generated by the channel processor could contain the deviation by first computing the expected value using the linear relationship inferred from the recent set of values on C3 and C4. The flexibility of the channel processor in our invention can be used to handle key aspects of the domain knowledge especially when the knowledge only covers certain regions of operation. This implies that complete knowledge of the relationships is not required for robust monitoring of the entity. It also allows incremental evolution of the system as more channels of data become available or gaps in domain knowledge are filled.

Referring to FIG. 1, the time dependent signals generated by the channel processor are input 111 to the multi-channel deviation detector module 103. The deviation detector module produces alerts based on the deviation in the behavior of one or more channels. This is done by considering the behavior represented in the time dependent signals in varying time intervals on each channel and comparing them with historically normal baseline signals. This allows for different reaction times and effect times in different channels due to the same phenomenon that is causing the abnormal behavior. A key component in the alert is a numeric level also called a numeric alert level that quantifies the deviation over all the considered channels and represents the degree of abnormality. The initial baseline is provided by the user in the form of an initial data set for each channel that is designated as normal. The deviation detection module can update the baseline over time. One method of updating the baseline is to add to it stable channel values that did not result in alert level above some user specified threshold. In addition, whenever a new value is added to the baseline the oldest value can be removed from it.

One approach to computing the alert level is by using an additive model in which the quantified deviations of each monitored channel are summed up. For each channel considered, the quantified deviation at a point in time can be computed by considering various current intervals in time (i.e., intervals in time ending at the current point in time) and taking the maximum deviation over all these intervals. The approach to consider various time intervals has been used in scan statistics as described in the book Scan Statistics and Applications, by J. Glaz and N. Balakrishnan, Birkhauser, 1999. The deviation can be quantified for a specific current time interval in a channel by the log likelihood ratio of (a) the alternate hypothesis that the record set of signal values has a distribution different from the previous values in the baseline and (b) the null hypothesis that all the signal values come from one distribution. The log likelihood ratio can be computed using the Gaussian distribution for the signal values. Other models can also be applied. Therefore in an additive model the numeric alert level is computed by summing up deviations over monitored channels. The deviations for each monitored channel are computed using the value distributions for the signals processed presently and the signals processed previously. Specifically, the deviation for a monitored channel is a log likelihood ratio of a first hypothesis that signals processed presently have a different value distribution from signals processed previously over a second hypothesis that all signals have a same value distribution.

Figure 2:
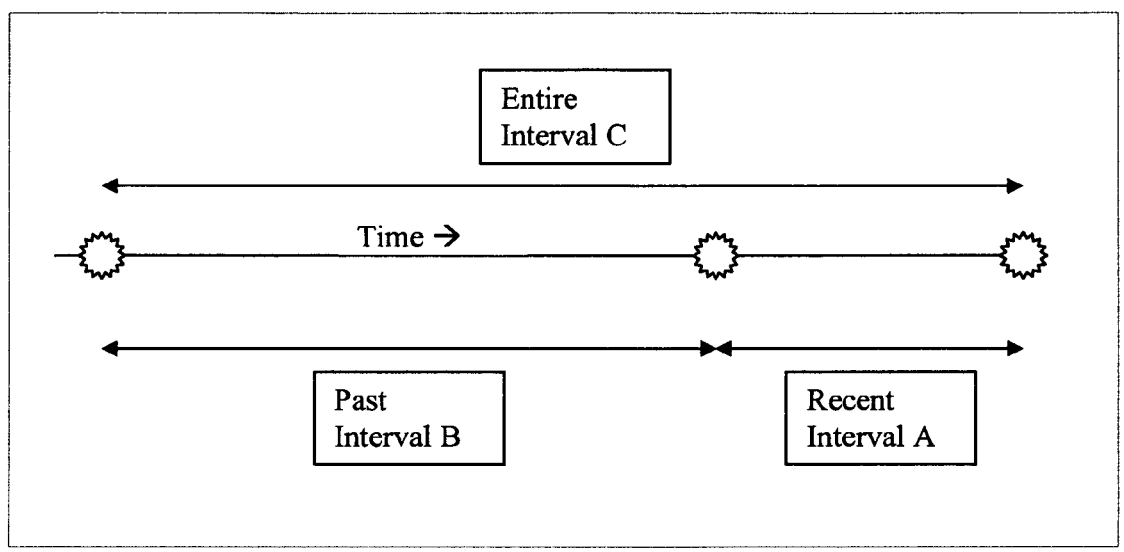
FIG. 2 is an illustration showing various intervals of time used in the deviation detection module

The intervals of time used in this quantification are illustrated in FIG. 2. Let Va, Vb, and Vc represent the signal values in intervals A, B and C. The interval C contains the baseline B and the recent interval A. Let the mean and standard deviations of the values in the various intervals be Ma and Sa for interval A, Mb and Sb for interval B and Mc and Sc for interval C. The log likelihood ratio for the choice A for the recent interval is computed using the Gaussian model as LLR(A,B,C)=Log-likelihood(Va, Ma, Sc)+Log-likelihood(Vb, Mb, Sc)−Log-likelihood(Vc, Mc, Sc)

Where log-likelihood(V, M. S) is given by $$-\sum_{v_i \in V} \log(S) + \log(2\pi)/2 + \frac{(v_i - M)^2}{2S^2}$$

The quantified deviation for a channel can be calibrated in various ways. One method used in the scan statistic formulation is to computer the likelihood of getting the computed deviation by chance even under the probability distribution model that would fit the entire time interval C. This is done by performing Monte Carlo experiments with random synthetic data generated using the probability distribution model for interval C (e.g., Gaussian distribution with mean Mc and standard deviation Sc). The maximum LLR for each of these experiments is computed and compared with the LLR for the real data to determine the p-value. For example, if the LLR for the actual data is ranked 8 amongst 999 random datasets then the corresponding p-value=0.008. Another method is to perform Monte Carlo experiments with random permutations of the data in interval C.

The alert level generated by the deviation detector module can be generated by combining the quantified deviations from the channels in other ways. For example, the alert level can be computed as the sum of the quantified deviations of only those channels whose p-value is below some user specified threshold of significance. The alert level can also be computed as the negation of the sum of the logs of the p-values for the individual channels.

The numeric alert level can also be computed using a multiplicative model taking a product of deviations over monitored channels, wherein signals processed presently and signals processed previously each have a value distribution, and wherein the deviation for each monitored channel is a likelihood of obtaining the value distribution of the signals processed presently under a hypothesis of a single value distribution. Further, the likelihood in the numeric alert level computation can be computed by performing Monte Carlo experiments by permuting in each experiment an order of data in the baseline.

The alerts generated by the deviation detector module 103 are inputted 112 and filtered by the report module 104 also using the signals from the channel processors to form reportable alerts that are a subset of the alerts and are presented to the user 105. This is done in part by determining an abstraction of the current state of the monitored entity also called an abstract state using signals inputted 113 from the channel processor 102. For example, the abstracted state of the entity with the earlier mentioned control channel C1 might simply be the time from which the channel has been designated as steady. This abstracted state information can be used by the report module to classify alerts as "new" or "repeat". This can be done as follows. Alerts generated when the abstracted state is the same are grouped together. In our example, the grouped alerts would all have the same time from which channel C1 has been steady. The earliest alert in each of these groups is categorized as "new" and the rest are categorized as "repeat". Therefore, in an embodiment the report module also determines an abstract state of the monitored entity at points in time and categorizes alerts as new if the abstract state has changed since a last alert, and categorizes alerts as repeat if the abstract state has not changed since a last alert. The report module has a rule-based reporting system. For example, a filtering rule for presenting alerts might be that the numeric alert level of a most recent alert be higher than that of a just previously reported alert by some user specified threshold. Another example filtering rule for alerts might be that an alert is presented to the user if the time difference between a most recent alert and a just previously reported alert exceeds some user specified threshold. Another example filtering rule is that all alerts (new and/or repeat) are presented to the user only if the alert level exceeds some user specified threshold. These rules can be combined to flexibly determine which alerts are presented to the user.

Figure 3:
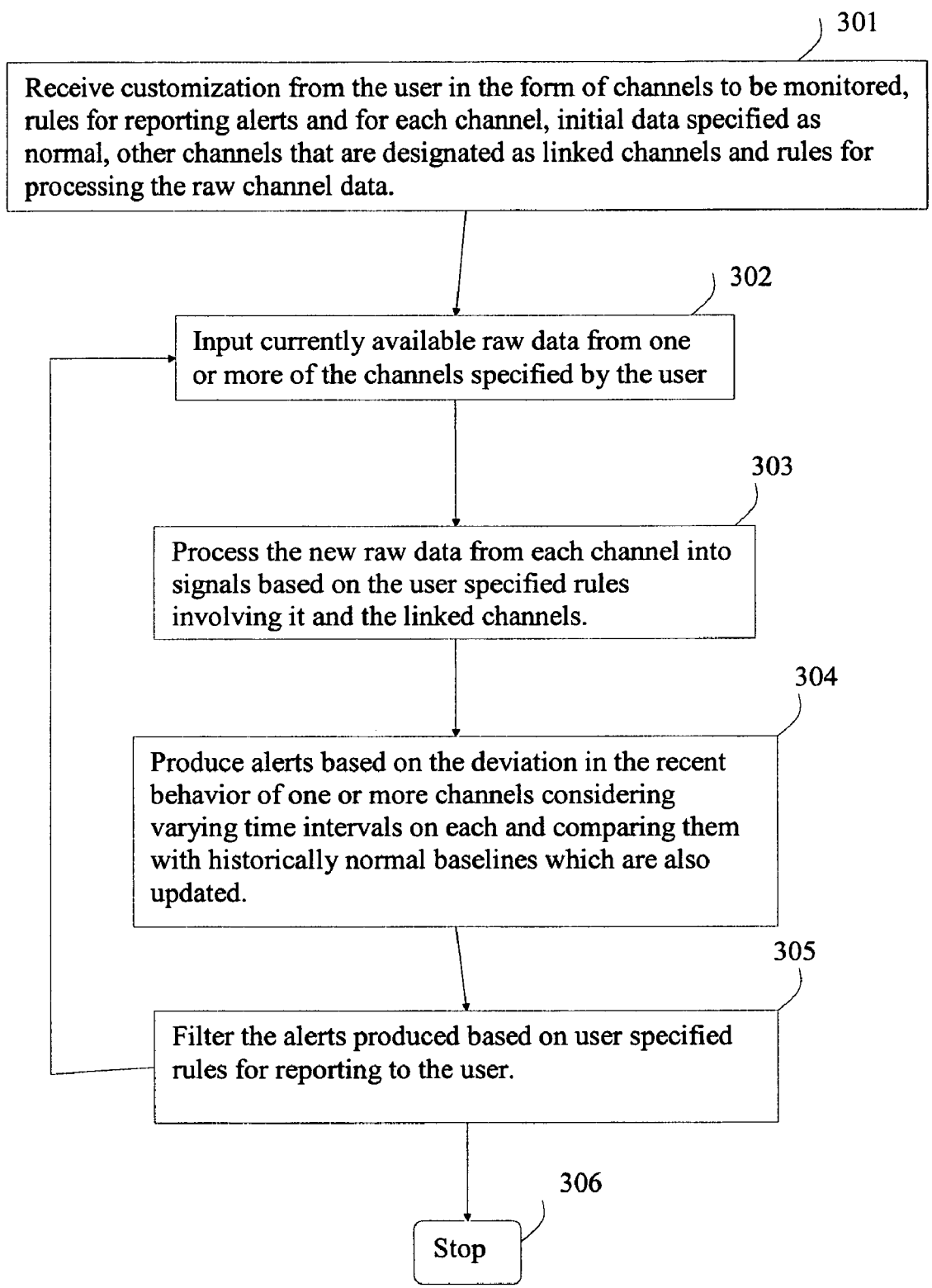
FIG. 3 is a flow chart of a method according to an embodiment of the present disclosure

Referring to FIG. 3, a method according to an embodiment of the present disclosure receives customization from the user in the form of channels to be monitored, rules for reporting alerts to the user and for each channel (i) initial data which is specified as normal (ii) a set of other channels that are designated as linked channels and (iii) rules for processing the raw data 301. The monitoring is done continuously by performing the sequence of tasks 302-305 until it is stopped 306. Each iteration starts with getting currently available raw data from one or more of the user specified channels as input 302. The new raw data that was input is processed into signals based on the user specified rules involving it and the linked channels 303. Alerts are then produced based on the deviation in the recent behavior of one or more channels considering varying time intervals on each channel and comparing them with historically normal baselines 304. The baselines representing normal behavior are also updated 304. The alerts produced are filtered based on user specified rules for reporting to the user 305.

In another example embodiment, the present invention provides a monitoring method for generating alerts indicating abnormal behavior using multiple channels of current raw real time data from a monitored entity by the following steps. The step of customizing is used to customize monitored channels to be monitored, rules for reporting alerts, initial data of each monitored channel that is specified as normal, any linked channels designated for each monitored channel, and processing rules for processing raw channel data. The step of receiving takes as input currently available raw data from at least one monitored channel. The step of processing uses the currently available raw data from each monitored channel and processes them into signals based on processing rules. The step of producing produces potential alerts, each potential alert having an alert level based on a deviation in recent behavior of at least one channel by considering varying time intervals on each monitored channel and comparing said signals within said varying time intervals with historically normal baselines. The step of filtering filters out reportable alerts from the potential alerts based on specified filtering rules. Lastly, the step of reporting presents the reportable alerts to the user. Further, this method can be applied repeatedly by replacing the current raw data with each next set of raw data received from the entity, and by repeating the steps of receiving, processing, producing, filtering, and reporting for each next set of raw data.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention.

Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What I claim, is:

1. A method for monitoring real-time process of a monitored entity by a set of multiple data channels in order to detect abnormalities within the real-time process, where sensed inputs of various sensor values from the monitored entity are received in a computer system by a system interface module containing the set of multiple data channels, the method comprising:

obtaining raw channel data over a time duration of information of an at least one monitored data channel contained in the system interface module of the computer system;

processing said raw channel data in the computer system to form a set of time dependent signals based on at least one user specified processing rule;

producing an at least one reportable alert based on a deviation value, where the deviation value is based on a deviation in behavior in the at least one monitored channel of the monitored entity;

filtering said at least one reportable alert based on an at least one user specified filtering rule to form said at least one reportable alert, wherein said at least one user specified filtering rule is taken from a group of filtering rules consisting of:

determining if a time difference between a most recent alert and a just previously reported alert exceeds a first user specified threshold; and determining if a difference in numeric alert levels between the most recent alert and the just previously reported alert exceeds a second user specified threshold; and reporting said at least one reportable alert to a system user, where said at least one reportable alert represents the deviation value, where the deviation value is a value between an actual value and an expected value of the at least one monitored channel, where the deviation value is produced by a deviation detector in the computer system, where the deviation value is based upon said set of time dependent signals for varying time intervals and comparing the set of time dependent signals with a set of historically normal baseline time dependent signals, and where said at least one reportable alert causes the system user to control the deviation in behavior in the real-time process of the monitored entity.

2. The method as recited in claim 1, wherein the processing said raw channel data to form time dependent signals comprises:

forming linkage between said at least one monitored channel and at least one other channel of the set of multiple data channels to form an at least one set of linked channels;

employing said linkage in processing at least one particular processing rule for the at least one set of linked channels.

3. The method as recited in claim 2, wherein a channel is determined to be stable if all channels of the at least one set of linked channels are each steady for a user specified time period.

4. The method as recited in claim 1, wherein the producing the at least one reportable alert based on the deviation in behavior in the at least one monitored channel comprises updating an initial normal baseline of an initial baseline data set.

5. The method as recited in claim 4, further comprising updating the initial normal baseline by adding stable channel values that did not result in a numeric alert level above a user specified threshold.

6. The method as recited in claim 1, wherein the producing comprises:

computing a numeric alert level for each of said at least one reportable alert.

7. The method as recited in claim 6, further comprising computing the numeric alert level using a multiplicative model taking a product of deviations over monitored channels, wherein signals processed presently and signals processed previously each have a value distribution, and wherein the deviation for each monitored channel is a likelihood of obtaining the value distribution of the signals processed presently under a hypothesis of a single value distribution.

8. The method as recited in claim 7, further comprising computing quantified deviations of each monitored channel by performing at least one of Monte Carlo experiments with random synthetic data generated using an interval probability distribution model and by performing Monte Carlo experiments with random permutations of the interval data.

9. The method as recited in claim 6, wherein computing the numeric alert level for each of said at least one reportable alert is accomplished using an additive model summing up deviations over monitored channels, wherein both said set of time dependent signals for varying time intervals and comparing the set of time dependent signals with historically normal baseline time dependent signals have a value distribution, and wherein the deviation value for each of the at least one monitored channel is a log likelihood ratio of:

a first hypothesis that signals processed presently have a different value distribution from signals processed previously, over a second hypothesis that all signals have a same value distribution.

10. The method as recited in claim 9, further comprising computing the deviation for each of the at least one monitored channel for user determined time intervals and choosing a maximum deviation value in the additive model.

11. The method as recited in claim 9, further comprising computing the log likelihood ratio using a Gaussian distribution to represent the value distribution.

12. An apparatus for monitoring multiple data channels of a real-time process in order to detect abnormalities within the process, said apparatus comprising:
   an interface module, contained in a computer system, to obtain raw channel data over a time duration of information of an at least one monitored data channel of said process;
   a channel processor, contained in the computer system and in electrical communication with the interface module, to process said raw channel data to form a set of time dependent signals based on at least one user specified processing rule;
   a deviation detector module, contained in the computer system and in electrical communication with the channel processor, to produce an at least one alert, based on a deviation value, where the deviation value is based on a deviation in behavior in an at least one data channel of said multiple data channels, said deviation in behavior being based upon said set of time dependent signals for varying time intervals and comparing said set of time dependent signals with historically normal baseline signals; and
   a report module, contained in the computer system and in electrical communication with the deviation detector module, to take said at least one alert from the deviation detection module and said set of time dependent signals from the channel processor, and to filter out a subset of alerts for presentation to a user, wherein said subset of alerts is filtered based on at least one filtering rule taken from a group of filtering rules consisting of:
      determining if a time difference between a most recent alert and a just previously reported alert exceeds a first user specified threshold; and
      determining if a difference in numeric levels between the most recent alert and the just previously reported alert exceeds a second user specified threshold,
   where said subset of alerts for presentation to the user represents the deviation value of each alert in said subset of alerts, where the deviation value is a value between an actual value and an expected value of the at least one monitored channel, and where said subset of alerts for presentation to the user causes the user to control the real-time process being monitored by controlling the deviation in behavior in the at least one data channel of said multiple data channels.

13. A system customized by a user to generate alerts, said alerts indicating abnormal behavior in a monitored process of the system, by monitoring a set of multiple channels of raw real-time data of a monitored entity, the system comprising:
   a channel processor, contained in a computer system, to process raw data from each channel in the set of multiple channels into a set of signals based on user specified rules involving characteristics of each channel in the set of multiple channels, and user specified rules involving any other channels specified by the user as being linked to each channel in the set of multiple channels;
   a multi-channel deviation detector module, contained in the computer system and in electrical communication with the channel processor, to take the set of signals from the channel processor and produce a set of alerts, each of said set of alerts having a level based on a deviation value, where the deviation value is based on a deviation in recent behavior of at least one channel in the set of multiple channels, said multi-channel deviation detector module considering a group of varying time intervals on each of at least one channel in the set of multiple channels, and to compare the set of signals within said group of varying time intervals with a historically normal baseline using initial normal data for each of at least one channel in the set of multiple channels; and
   a report module to take said alerts from the deviation detection module and the set of signals from the channel processor, and to filter out a subset of alerts for presentation to the user, wherein said subset of alerts is filtered based on at least one filtering rule taken from a group of filtering rules consisting of:
      determining if a time difference between a most recent alert and a just previously reported alert exceeds a first user specified threshold; and
      determining if a difference in numeric levels between the most recent alert and the just previously reported alert exceeds a second user specified threshold, and
   where said subset of alerts for presentation to the user represents the deviation value of each alert in said subset of alerts, where said subset of alerts for presentation to the user causes the user to control the monitored process by controlling the deviation in recent behavior of at least one channel in the set of multiple channels.

14. The system as recited in claim 13, wherein the report module also determines an abstract state of the monitored entity at points in time and to categorize alerts as new if the abstract state has changed since a last alert, and to categorize alerts as repeat if the abstract state has not changed since the last alert.

15. A method for generating alerts indicating abnormal behavior by processing, in a channel processor of a computer system, a set of current raw real-time data from a monitored entity, where sensed inputs of various sensor values from the monitored entity are received in the computer system by a system interface module containing a set of multiple data channels, the method comprising:
   customizing the channel processor by receiving in the computer system from a user a designation of each for the set of multiple data channels to be monitored, rules for reporting alerts, initial data of each monitored channel specified as normal, any linked channels designated for each of an at least one data channel monitored, and a set of processing rules for processing raw channel data;
   receiving as input in the channel processor the set of currently available raw data from the at least one data channel monitored;
   processing by the channel processor the currently available raw data from each of the at least one data channel monitored into signals based on said set of processing rules;
   producing potential alerts, each potential alert having an alert level based on a deviation value, where the deviation value is based on a deviation in recent behavior of at least one channel by considering varying time intervals on each monitored channel and comparing said signals within said varying time intervals with historically normal baselines;
   filtering a set of reportable alerts from the potential alerts based on specified filtering rules, wherein at least one user specified filtering rule is taken from a group of filtering rules consisting of:

determining if a time difference between a most recent alert and a just previously reported alert exceeds a first user specified threshold; and determining if a difference in numeric levels between the most recent alert and the just previously reported alert exceeds a second user specified threshold; and reporting said set of reportable alerts to a system user, where said set of reportable alerts represents the deviation value for each alert in said set of reportable alerts, where the deviation value is a value between an actual value and an expected value, based on the deviation in recent behavior of at least one channel, and where said set of reportable alerts causes the system user to control the deviation in behavior in the real-time process of the monitored entity.

16. The method as recited in claim 15, further comprising replacing said currently available raw data with each next set of raw data received from the entity, and repeating the receiving, processing, producing, filtering, and reporting for each next set of raw data.

17. An article of manufacture for monitoring a set of multiple data channels of a real-time process in order to detect abnormalities, the article of manufacture storing machine readable instructions, which when executed cause the machine to perform the method comprising:

obtaining raw channel data over a time duration of information of at least one monitored channel of said real-time process, by a system interface module contained in a computer system;

processing said raw channel data, by a channel processor contained in the computer system, to form time dependent signals based on at least one user specified processing rule; and producing in a multi-channel deviation detector module contained in the computer system an at least one alert based a deviation value, where the deviation value is based on a deviation in behavior in at least one channel of said set of multiple data channels, said deviation in behavior being based upon said time dependent signals for varying time intervals and comparing the signals with historically normal baseline signals;

filtering said at least one alert based on an at least one user specified filtering rule to form an at least one reportable alert, wherein said at least one user specified filtering rule is taken from a group of filtering rules consisting of:

determining if a time difference between a most recent alert and a just previously reported alert exceeds a first user specified threshold; and determining if a difference in numeric levels between the most recent alert and the just previously reported alert exceeds a second user specified threshold; and reporting said at least one reportable alert to a system user, where said at least one reportable alert represents the deviation value, where the deviation value is a value between an actual value and an expected value based on the deviation in behavior in at least one channel of said set of multiple data channels, and where said at least one reportable alert causes the system user to control the deviation in behavior in the real-time process.

18. A computer program product that includes a computer readable medium useable by a computer processor contained in a computer system, the medium having stored thereon a sequence of instructions which, when executed by the computer processor, causes the processor to monitor a set of multiple data channels of a real-time process in order to detect abnormalities, wherein the computer processor is a channel processor, and wherein the computer program product executes the method comprising:

obtaining raw channel data over a time duration of information of at least one monitored channel of said real-time process, by a system interface module contained in the computer system;

processing said raw channel data, by a channel processor contained in the computer system, to form time dependent signals based on at least one user specified processing rule; and producing, in a multi-channel deviation detector module contained in the computer system, an at least one alert based on a deviation value, where the deviation value is based on a deviation in behavior in at least one channel of said set of multiple data channels, said deviation being based upon said time dependent signals for varying time intervals and comparing the signals with historically normal baseline signals;

filtering said at least one alert based on an at least one user specified filtering rule to form an at least one reportable alert, wherein said at least one user specified filtering rule is taken from a group of filtering rules consisting of:

determining if a time difference between a most recent alert and a just previously reported alert exceeds a first user specified threshold; and determining if a difference in numeric levels between the most recent alert and the just previously reported alert exceeds a second user specified threshold; and reporting said at least one reportable alert to a system user, where said at least one reportable alert represents the deviation value, where the deviation value is a value between an actual value and an expected value based on the deviation in behavior in at least one channel of said set of multiple data channels, and where said at least one reportable alert causes the system user to control the deviation in behavior in the real-time process.

19. An article of manufacture for monitoring a set of multiple data channels of a real-time process in order to detect abnormalities, the article of manufacture storing machine readable instructions, which when executed cause a computer processor to perform the method comprising:

customizing, in a computer processor residing in a computer system, for the set of monitored data channels to be monitored, rules for reporting alerts, initial data of each monitored channel specified as normal, any linked channels designated for each channel in the set of monitored data channels, and processing rules for processing raw channel data, where the computer processor is a channel processor;

receiving an input in the channel processor currently available raw data from at least one monitored data channel in the set of monitored data channels;

processing, by the channel processor, the currently available raw data from each monitored data channel into signals based on said processing rules;

producing, in a multi-channel deviation detector, potential alerts, each potential alert having an alert level based on a deviation value, where the deviation value is based on a deviation in recent behavior of at least one monitored data channel by considering varying time intervals on each monitored data channel and comparing said signals within said varying time intervals with historically normal baselines;

filtering a set of reportable alerts from the potential alerts based on specified filtering rules, wherein at least one user specified filtering rule is taken from a group of filtering rules consisting of:
  determining if a time difference between a most recent alert and a just previously reported alert exceeds a first user specified threshold; and
  determining if a difference in numeric levels between the most recent alert and the just previously reported alert exceeds a second user specified threshold; and
reporting said set of reportable alerts to a system user, where said set of reportable alerts represents the deviation values of each alert in said set of reportable alerts, where the deviation value is a value between an actual value and an expected value based on the deviation in behavior in a set of data channels of said set of multiple data channels, and where said set of reportable alerts causes the system user to control the deviation in behavior in the real-time process.

20. A computer program product that includes a computer readable medium useable by a computer processor, the medium having stored thereon a sequence of instructions which, when executed by the computer processor, causes the computer processor to monitor multiple data channels of a real-time process in order to detect abnormalities in the real-time process, wherein the computer program product executes the method comprising:
  customizing, in the computer processor, for a set of monitored data channels to be monitored, rules for reporting alerts, initial data of each monitored channel specified as normal, any linked channels designated for each monitored channel, and processing rules for processing raw channel data, where the computer processor is a channel processor residing in a computer system;
  receiving as input in the channel processor currently available raw data from at least one monitored data channel;
  processing the currently available raw data from each monitored channel into signals based on said processing rules;
  producing, in a multi-channel deviation detector, potential alerts, each potential alert having an alert level based on a deviation value, where the deviation value is based on a deviation in recent behavior of at least one monitored data channel by considering varying time intervals on each monitored data channel and comparing said signals within said varying time intervals with historically normal baselines;
  filtering a set of reportable alerts from the potential alerts based on a set of user specified filtering rules, wherein at least one user specified filtering rule is taken from a group of user specified filtering rules consisting of:
    determining if a time difference between a most recent alert and a just previously reported alert exceeds a first user specified threshold; and
    determining if a difference in numeric levels between the most recent alert and the just previously reported alert exceeds a second user specified threshold; and
  reporting said set of reportable alerts to a system user, where said set of reportable alerts represents the deviation value of each alert in said set of reportable alerts, where the deviation value is a value between an actual value and an expected value based on the deviation in recent behavior of at least one monitored data channel, and where said set of reportable alerts causes the system user to control the deviation in recent behavior in the real-time process.

* * * * *